US012710800B2

(12) United States Patent
Young

(10) Patent No.: US 12,710,800 B2
(45) Date of Patent: Aug. 18, 2026

(54) DEVICE ENERGY MONITORING AND MANAGEMENT

(71) Applicant: VODAFONE GROUP SERVICES LIMITED, Newbury (GB)

(72) Inventor: Gavin Young, London (GB)

(73) Assignee: VODAFONE GROUP SERVICES LIMITED, Newbury (GB)

( * ) Notice: Subject to any disclaimer, the term of this patent is extended or adjusted under 35 U.S.C. 154(b) by 59 days.

(21) Appl. No.: 18/648,031

(22) Filed: Apr. 26, 2024

(65) Prior Publication Data

US 2025/0298455 A1 Sep. 25, 2025

(51) Int. Cl.
*G06F 11/30* (2006.01)
*G06F 1/3209* (2019.01)
*G06F 1/30* (2006.01)

(52) U.S. Cl.
CPC .............. *G06F 1/3209* (2013.01); *G06F 1/30* (2013.01)

(58) Field of Classification Search
CPC .................................................... G06F 1/3209
USPC ......................................................... 713/340
See application file for complete search history.

(56) References Cited

U.S. PATENT DOCUMENTS 9,965,781 B2 * 5/2018 Kashiwagi ......... G06Q 30/0283
2006/0200704 A1 * 9/2006 Takahashi ............. G06F 3/1238 714/38.14
2007/0094527 A1 * 4/2007 Frietsch .................. H04L 41/22 713/340
2011/0161695 A1 * 6/2011 Okita .................... G06F 1/3278 713/310
2019/0190788 A1 * 6/2019 Bugge ................. G06F 11/3062
2021/0337475 A1 * 10/2021 Cariou .................. H04L 5/0098

* cited by examiner

*Primary Examiner* — Volvick Derose
(74) *Attorney, Agent, or Firm* — Workman Nydegger

(57) ABSTRACT

Method and system comprising determining electricity usage of a plurality of devices operating within one or more local networks. Maintaining in a data store external to each local network, data representing the determined electricity usage for each device of the plurality of devices and data identifying the device local network of the device.

20 Claims, 14 Drawing Sheets

100

Obtain device details 110

Determine electricity usage for each device 120

Maintain data representing the determined electricity usage 130

Take action based on consolidate data set 140

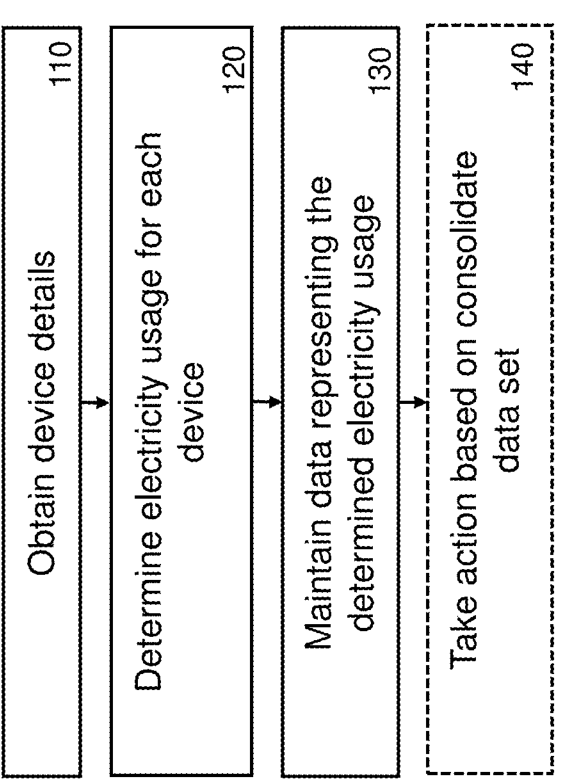
Fig. 1

Fig. 3
N, [Data Model Ref &/or Number of parameters in data model], [P1, P2 ... Pn], [P1, P2, ... Pn]
Number of connected devices
Data Model type reference/size
Data Model fields/ parameter values for each connected device in the home

Device Data Model Fields & Parameters

- Friendly name
- MAC Address
- IP address
- Class
- Type
- Brand
- Model
- OS Name
- OS Version
- Max Power
- Average Power
- Standby Power
- Current Power
- Runtime (hours)
- Energy usage over past hour, day, week, month, year

Fig. 4

Device Data Model Fields & Parameters

- -
- -
- -
- Class
- Type
- -
- Max Power
- Average Power
- Standby Power
- Current Power
- Runtime (hours)
- Energy usage over past hour, day, week, month, year

Fig. 5

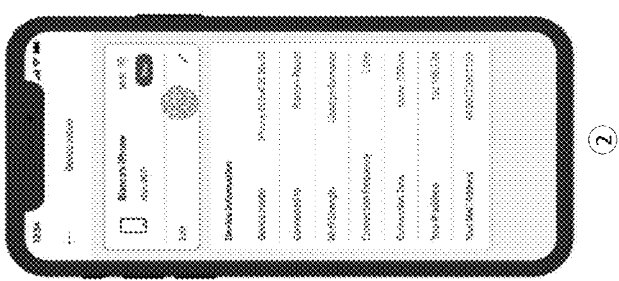
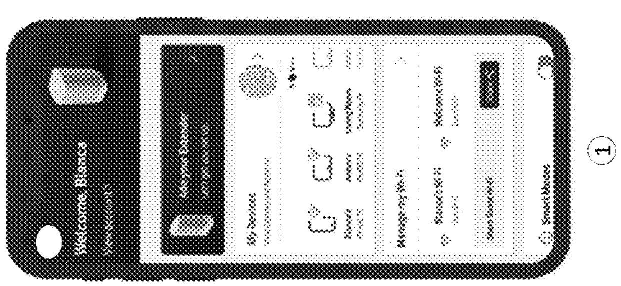
Fig. 8

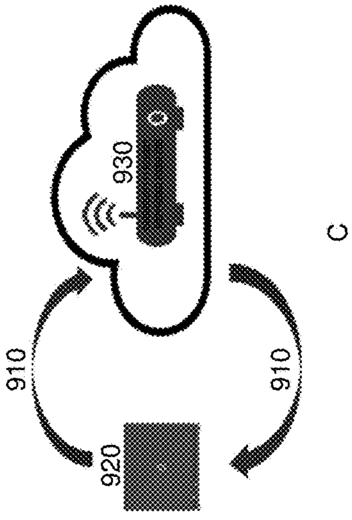
C
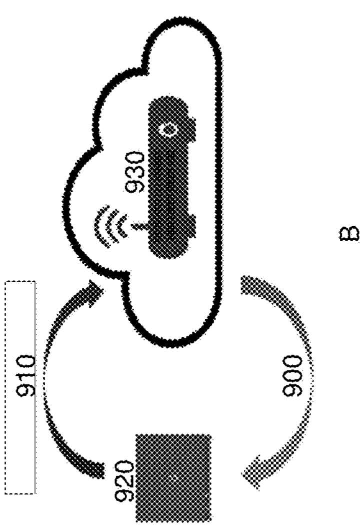
B
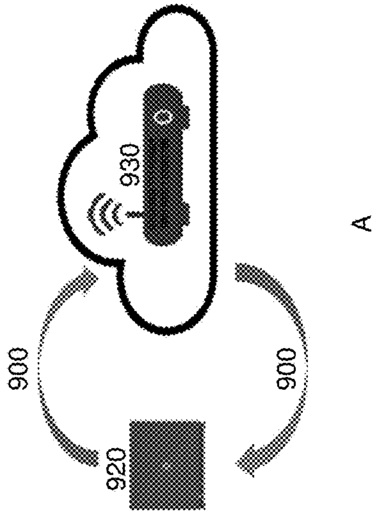
A
Fig. 9

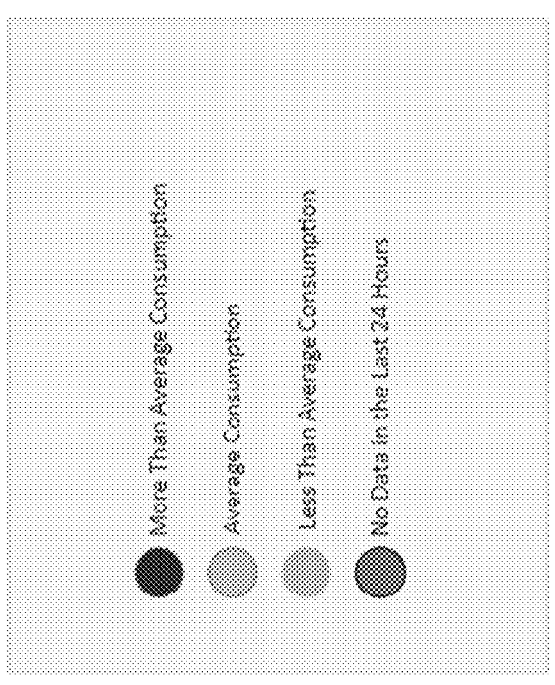
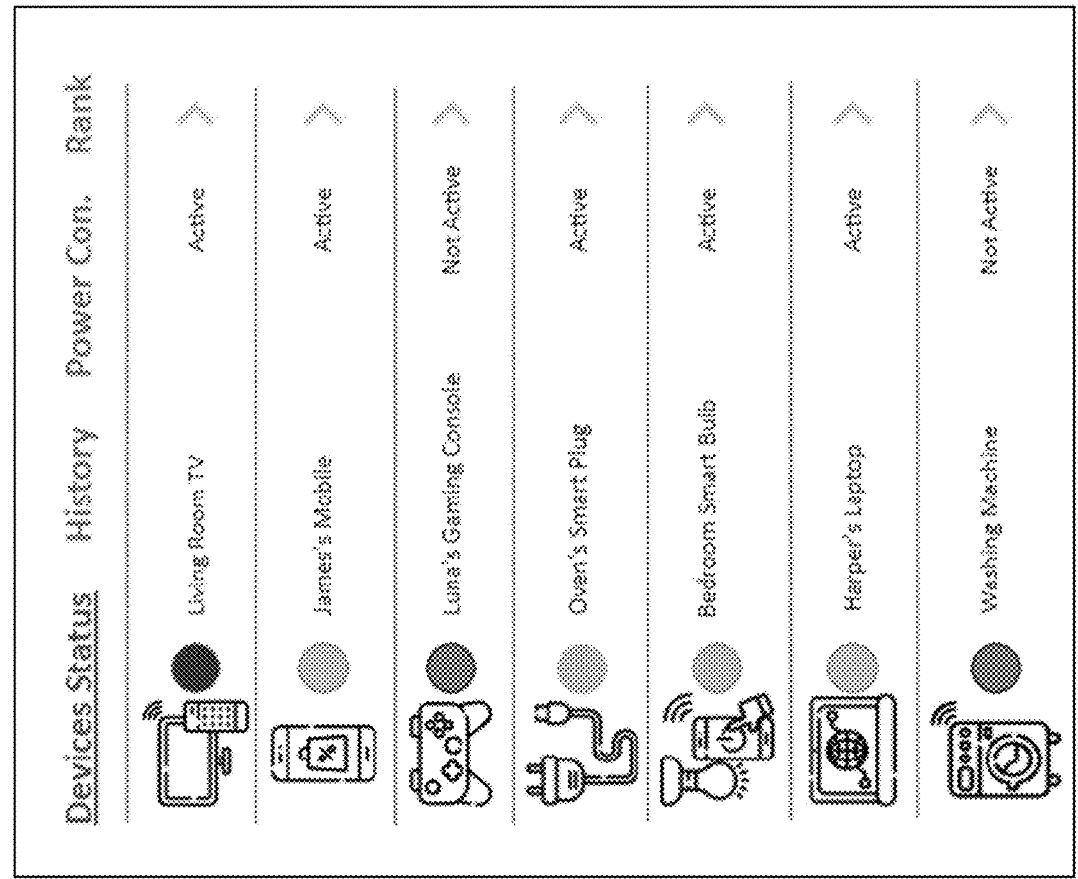
Fig. 11

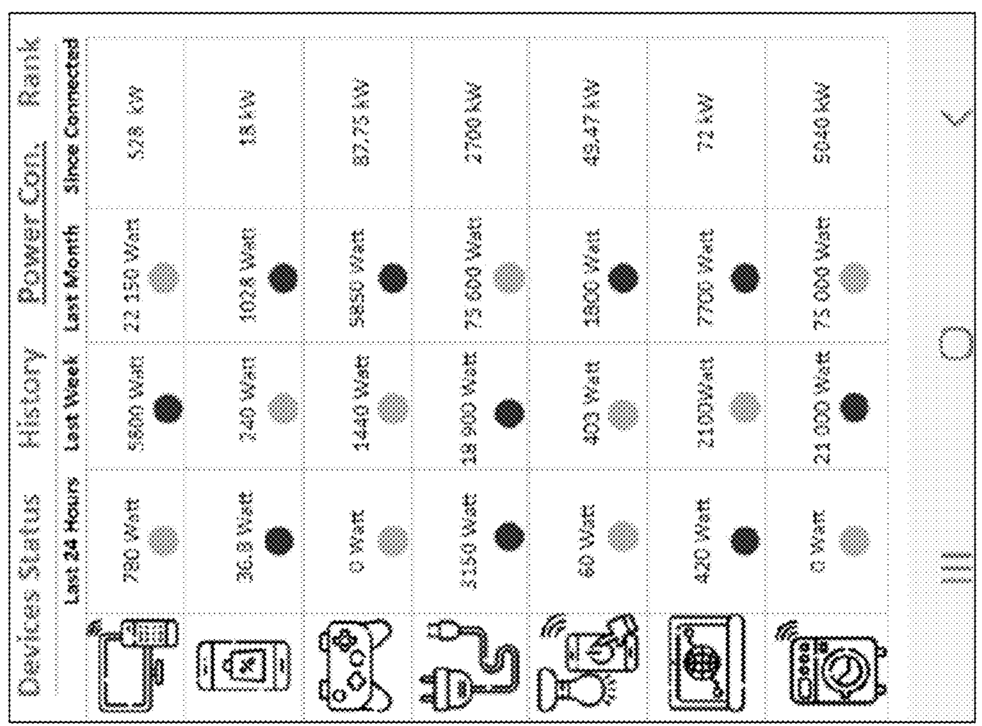
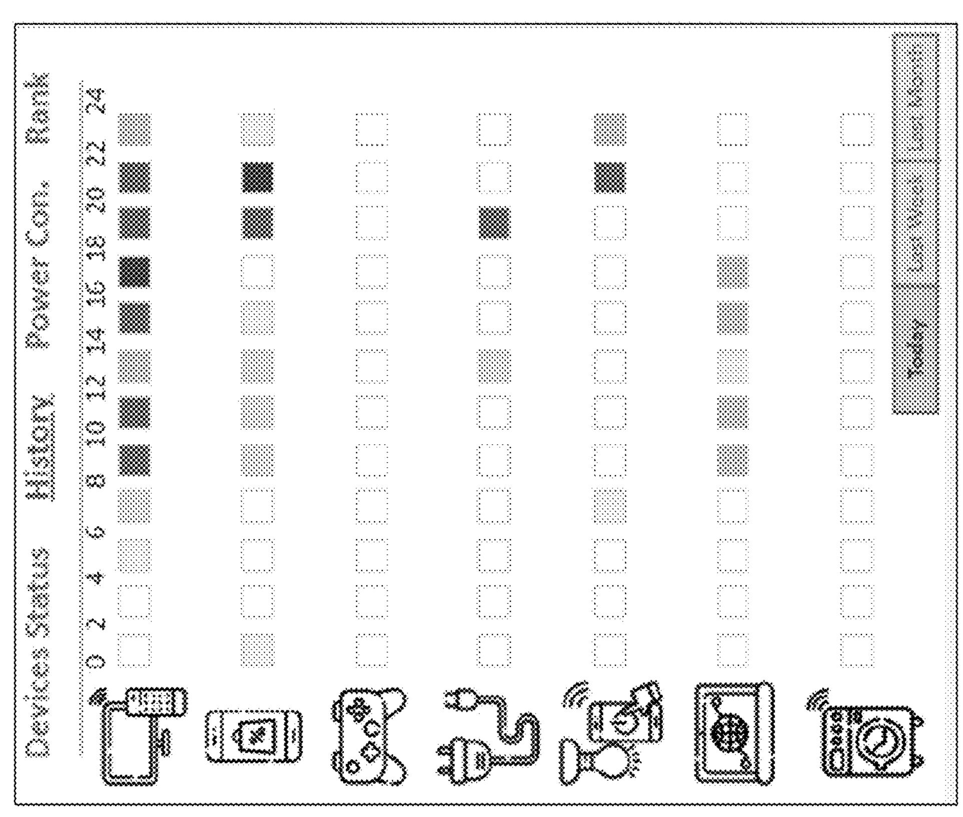
Fig. 13

DEVICE ENERGY MONITORING AND MANAGEMENT

FIELD OF THE INVENTION

The present invention relates to a system and method for monitoring and managing electrical energy or devices within a network, and especially monitoring energy usage of Wi-Fi connected devices.

BACKGROUND OF THE INVENTION

All electrical devices consume power, but it can be difficult to determine how much power each device is consuming. Furthermore, devices do not always consume power at the same rate. Whilst devices such as refrigerators can be powered more or less continuously, televisions may have high energy consumption at specific times of the day and low or no energy consumption at other times. An energy provider may only be aware of the overall energy consumption of a property by information gathered by an electric meter. Even if a smart meter is installed and communicating regularly with the energy provider, this may only provide the overall energy consumption of a property at different times. There is no straightforward way to determine a breakdown of energy consumption for individual devices without additional hardware.

If such a breakdown of energy consumption per device is not available then it is not possible to monitor, manage or limit energy consumption effectively. This can lead to inefficiencies, which can be significant, especially amongst large numbers of properties. Without such efficiency gains, the environmental impact of electricity generation may be increased unnecessarily. Furthermore, the ability to more effectively manage the energy consumption of devices within a property can mean that energy savings can be realised without significantly affecting the functionality of individual devices.

One option for determining the energy consumption of individual devices is by using smart plugs to measure electrical power for individual devices directly. However, the smart plugs will also consume power. It is also impractical to install smart plugs for every device in a property. Furthermore, individual smart plugs cannot effectively monitor or manage multiple devices at the same time.

Therefore, there is required a method and system that overcomes these problems.

SUMMARY OF THE INVENTION

A local network (e.g., within a property such as a home or office), such as a Wi-Fi network served by a broadband router, contains a plurality of connected devices. Each connected device will have its own electrical energy consumption. The system determines the energy consumption of each device within the local network. The system also monitors a plurality of other local networks in the same way. Energy or electricity usage may be determined in terms of an instantaneous power (W) or the energy used over a time period (kWh). These data may be provided by each device directly or consolidate through a proxy. For example, an energy sensor or current meter within the device may provide the data as an output signal, preferably in a standardised form. If a device does not contain an energy sensor, then its power consumption may be reported by another device or in another way. For example, this may be a smart plug that measures the power provided to the mains supply of the device (e.g., 110 v or 240 v) or the power may be estimated in another way based on device type and operating conditions. Within the local network there may be a mix of directly reporting devices and indirectly reporting devices. Preferably, the system and method collect the energy consumption data from each device in the same or standardised data format. These data may be collected over Wi-Fi or another local wireless protocol (e.g., Bluetooth, BLE, Zigbee, Z-wave, Matter, etc.).

However, the energy consumption data are determined, the system and method maintains an external record or database containing up to date information regarding each local network and the electricity usage for devices within those networks. This may be described as a digital twin for each local network and can be used to profile the energy consumption of connected devices within each home or office. Therefore, this advantageously combines the concepts of digital fingerprinting or gaining information about individual devices, the inclusion of energy consumption information for each device, and a digital shadow, where the data are stored virtually or in a cloud. Machine learning, analytics, and closed loop automation can then be applied to reduce energy consumption and provide other improvements.

The system and method may further analyse the stored data of energy consumption for the devices in the local network and make recommendations to a user based on this analysis. Automated actions may be triggered based on the output and/or centrally stored data. For example, the system may communicate with individual devices to instruct them to make a configuration change. This may include changing a power mode (e.g., from "on" to "standby") or switch off the device at night, for example.

The system and method may provide access to the stored data to external entities. This may take the form of a digital fingerprint or digital shadow based on the energy consumption of one or more local networks (e.g., a property). External entities may be provided access to the data of the digital fingerprint or digital shadow for the local network or a plurality of local networks. This access may be provided as an application programming interface (API) response following an API call from the external entity.

Against this background and in accordance with a first aspect there is provided a method comprising the steps of:

- determining electricity usage of a plurality of devices operating within one or more local networks;
- maintaining in a data store external to each local network, data representing the determined electricity usage for each device of the plurality of devices and data identifying the device local network of the device. Therefore, the energy usage of a property served by the local network can be monitored and managed more effectively.

Preferably, the method may further comprising the step of:

- executing one or more actions based on the data representing the determined electricity usage. Therefore, actions can be taken to reduce or manage energy consumption.

Optionally, the one or more actions may comprise changing a mode of operation of at least one of the plurality of devices. This can be done to reduce energy consumption without affecting functionality.

Preferably, changing the mode of operation may be to switch off one or more Wi-Fi bands of the at least one of the plurality of devices. This can save power without removing the device from the network, especially when it is determined (e.g., using AI) that the device may not be used at a particular time of day or week.

Optionally, the action may be switching one or more of the devices of the plurality of devices from a high power mode to a low power mode or switching off one or more of the devices. Other actions may be taken. The modes may also be switched back when it is determined that increased use of the device is required or soon to be required.

Optionally, the one or more actions may be implemented as power management commands stored within the data store and transmitted to one or more devices of the plurality of devices. The one or more actions may be also be implemented by an external entity or server (e.g., an energy supplier), for example.

Preferably, the data representing the determined electricity usage may be updated and stored or synchronised continuously. Therefore, the most up-to-date information may be made available. Furthermore, if a data connection with a local network or device is lost then the stored data will be the most recent or freshest data.

Optionally, the step of determining electricity usage for each device in the plurality of devices may further comprise the step of receiving from each device data providing the electricity usage. Each device may monitor its own energy consumption (e.g., current and/or power over time) and report this in a suitable format (e.g., a standardised format). This may require software and sensors (and/or memory to store a history of energy usage) within each device to carry out these measurements. This may be a direct way to determine electricity usage.

Preferably, the data received from each device may be in the same or a standardised format and includes an identifier of the device. This enables interoperability and other enhancements.

Optionally, the standardised format may be any one of: Matter; Broadband Forum (BBF) data model; and comma separated variable, CSV. Other formats may be used.

Optionally, the step of determining electricity usage for each device in the plurality of devices further comprises the steps of:

determining from the obtained details a device type for each device operating within the local network; and retrieving from a data storage, data indicating electricity usage for the device type of each device. This may be an indirect method of determining electricity usage but can be effective for certain types of devices that have a predictable energy consumption. For example, refrigerators and freezers may be operating all of the time and have substantially constant and regular electricity usage (e.g., provided by a manufacturer or external tester). Such data can be stored in a database or other datastore and associated with identifiers of different devices. The values may be adjusted or multiplied by a different parameters depending on other measurements or data (e.g., the weather or outside temperature). For example, heaters may consume more power during colder days.

Optionally, the data indicating the electricity usage may include electricity usage during a low power mode and a high power mode of at least one device type. Therefore, information that indicates the device type and what power mode it was operating in (e.g., low, medium, high, sleep, standby, full operation, etc.) and information that each mode is associated with a predetermined, or stored electricity or energy consumption parameter, can be used to calculate or estimate electricity usage relatively precisely without requiring direct measurements or sensors within each device.

Optionally, the step of determining electricity usage for each device in the plurality of devices operating within the local network may further comprise determining an amount of time of the at least one device spent in the low power mode and an amount of time spent in the high power mode. Therefore, a more accurate estimation of the electricity usage for each device can be made without requiring sensors or monitoring software within the device.

Preferably, the local network may be a Wi-Fi network. The local network may include or be based on other wireless or wired protocols. This may include Ethernet or powerline communications, for example.

Optionally, the step of determining electricity usage for each device in the plurality of devices operating within the local network may further comprise:

determining a Wi-Fi signal strength of at least one of the plurality of devices operating within the local network. Devices may reduce their Wi-Fi signal strength when in a sleep or low-power mode. Furthermore, devices may disable or switch off certain Wi-Fi bands if they have more than one band or frequency. A wireless router may be aware of the capabilities of each device and so can determine when such changes arise. This can indicate a power mode or electricity usage of each device without requiring on-device sensors or monitoring or connected smart plugs to directly measure electrical power. When the router or other component detects that a device has switched off one or more Wi-Fi bands then a determination may be made that the device is in a low power or standby mode, for example. When the router or other component detects that a device has switched on all Wi-Fi bands then a determination may be made that the device is in a high power or fully operational mode, for example. Current digital fingerprinting techniques may include appropriate Wi-Fi signal strength, but a further enhancement is the use of these data to infer energy usage of the device. The process can operate in both directions with the router or another entity causing the device to disable or enable different Wi-Fi bands or protocols on the device to alter its energy usage.

Optionally, the data of electricity usage may be presented to a user of the local network or another person. The data may be presented in the form of a relative ranking of electricity usage. Consolidated data can be presented (based on the data in the data store) in other formats such as listed in order of average electricity usage or by historical power usage by day, week, month, year, etc.

Optionally, the method may further comprise the step of retrieving from the data store data representing the determined electricity usage for each device in at least one of the plurality of local networks; and providing the retrieved data to a server or entity external to the local network. Therefore, different entities and organisations can make use of the information generated by one or more local networks. Actions taken at the server or external to the local network may include changing how electrical power is supplied to a property served by the local network. For example, different energy tariffs can be used or selected to charge for electricity to the property served by the local network. In an example implementation, a tariff may alter costs for electricity at different times of day. The actions may include switching on or off devices at different times of day and synchronised with the tariff to make use of lower cost electricity at different times. The data may be provided from the data store and using a data aggregator that stores data from a plurality of local networks.

Optionally, the step of providing the retrieved data to a server external to the local network may further comprise providing a response to an application programming interface, API, request issued by the server external to the local network. Some details within the information provided by the API, including localisation information, may vary for different local networks and depending on whether the user or customer has provided consent. The returned data may be adjusted based on privacy wishes or settings, for example.

Optionally, the provided data may include location data of the local network. This may be provided by some but not all of the local networks, depending on privacy preferences by users or customers administering the local networks.

Optionally, the plurality of devices may include any one or more of:

television;
computer;
refrigerator;
freezer;
smart phone;
camera;
washing machine;
a dryer;
a water heater;
dish washer; and/or
oven. Other devices may be included.

Optionally, the details of the plurality of devices operating within the local network may comprise any one or more of:

device name;
device type;
location;
IP address;
MAC address; and
brand. Other details may be included.

In accordance with a second aspect, there is provided a system comprising means for carrying out any of the methods described above.

Optionally, the means for carrying out the method may be within a broadband router or gateway. The broadband router may include functionality or components to provide one or more wireless protocols such as Wi-Fi, Bluetooth, BLE, Zigbee, Z-wave, etc.

In accordance with a third aspect, there is provided one or more non-transitory computer-readable media storing instructions that, when executed by a computing device comprising at least one processor and memory, cause the computing device to:

determine electricity usage of a plurality of devices operating within one or more local networks; and maintain in a data store external to each local network, data representing the determined electricity usage for each device of the plurality of devices and data identifying the device local network of the device.

Optionally, the computer-readable media instructions that, when executed by a computing device comprising at least one processor and memory, may further cause the computing device to execute an action based on the data representing the determined electricity usage for each device in one or more local networks.

In accordance with a fourth aspect, there is provided a computer system comprising:

at least one processor;

memory storing instructions that, when executed by the at least one processor, cause the computer system to:

determine electricity usage of a plurality of devices operating within one or more local networks; and maintain in a data store external to each local network, data representing the determined electricity usage for each device of the plurality of devices and data identifying the device local network of the device.

The methods described above may be implemented as a computer program comprising program instructions to operate a computer. The computer program may be stored on a computer-readable medium, including a non-transitory computer-readable medium.

The computer system may include a processor or processors (e.g., local, virtual or cloud-based) such as a Central Processing Unit (CPU), and/or a single or a collection of Graphics Processing Units (GPUs). The processor may execute logic in the form of a software program. The computer system may include a memory including volatile and non-volatile storage medium. A computer-readable medium (CRM) may be included to store the logic or program instructions. For example, embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:

FIG. 1 a flowchart of a method for monitoring and/or managing devices in a local network, such as a home or office environment;

FIG. 4 shows an example data set format used within the method of FIG. 1, according to first user preferences;

FIG. 5 shows an example data set format used within the method of FIG. 1, according to second user preferences;

FIG. 8 shows screens shots of a mobile application used to display information obtained using the method of FIG. 1;

FIG. 9 shows schematically the use of different data models to update data between devices in the local network and virtual representations of those data;

FIG. 11 shows further screens shots of the mobile application used to display information obtained using the method of FIG. 1;

FIG. 13 shows further screens shots of the mobile application used to display information obtained using the method of FIG. 1;

It should be noted that the figures are illustrated for simplicity and are not necessarily drawn to scale. Like features are provided with the same reference numerals.

DETAILED DESCRIPTION OF THE PREFERRED EMBODIMENTS

Figure 2:
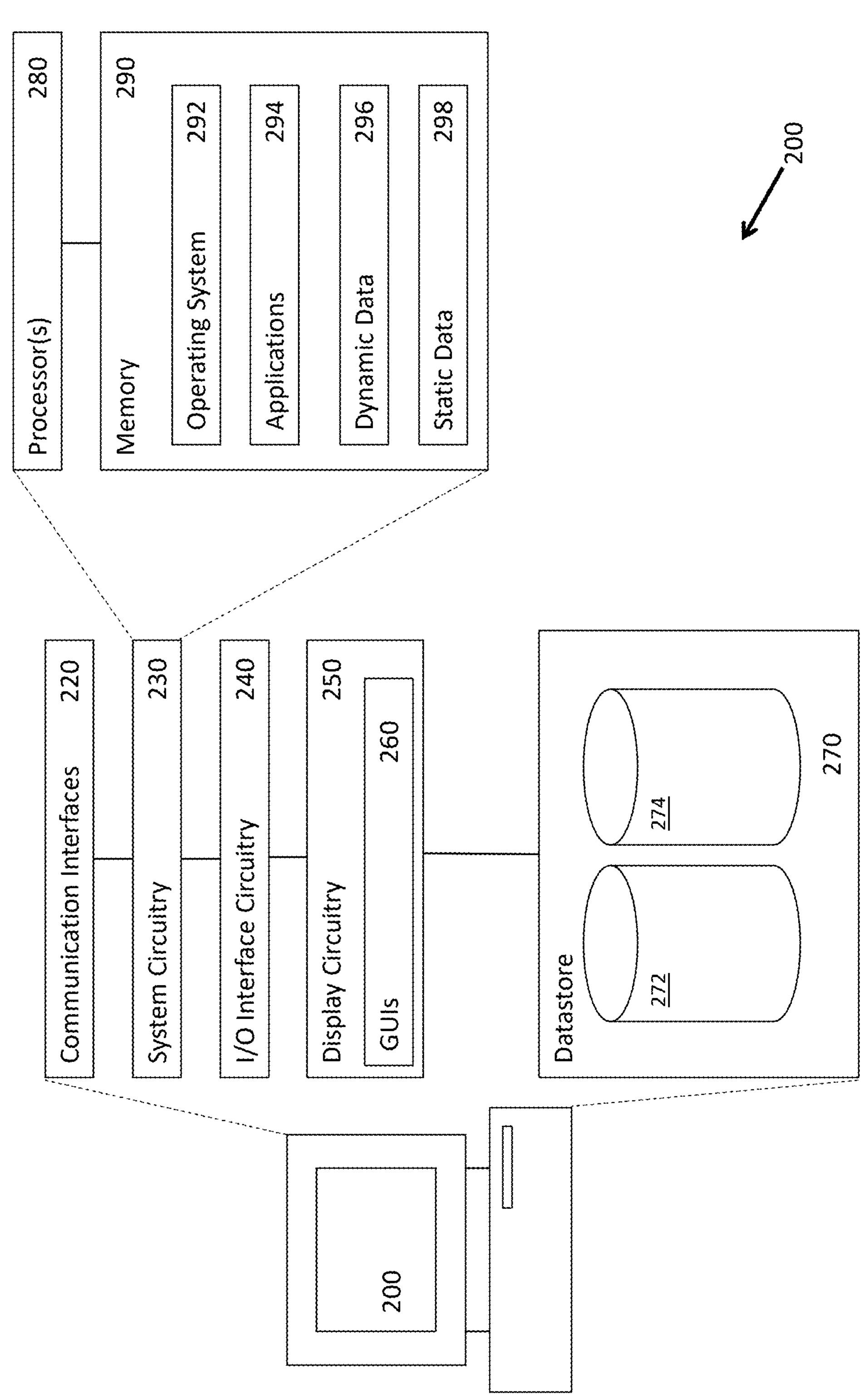
FIG. 2 shows a schematic diagram of a computer system used to implement the method of FIG. 1.

FIG. 1 shows a flowchart of a method 100 for monitoring and managing devices in a local network, such as a Wi-Fi network served by a broadband router or gateway. The local network may be situated within a home or office environment, for example. Device details or properties are obtained at step 110. The device details may include different parameters such as device identifier, device type, manufacturer and many other fields. Each device may have different details. At step 120, electrical usage for each device is determined. There may be different ways of determining, measuring and/or recording electrical or energy usage of each device. For example, the device details obtained at step 110 may include one or more values indicating electricity usage of the device. This information may be provided in a standardised format or by an agent or client within each device or in different formats and consolidated by a component or agent within the local network (e.g., within the router or gateway).

In another example implementation, energy usage may be determined indirectly. For example, energy usage of a device may be determined by searching for an estimate of electricity usage from a database or data store for the particular device type (e.g., provided in step 110). If the device can have different modes of operation and each mode may have a different energy usage, then the electricity usage of the device can be estimated based on amounts of time spent in different modes of operation. Each device may report how long they have been in each mode of operation (e.g., stored or monitored within the device) or this may be inferred from other activity. For example, Wi-Fi signal strength or the number of Wi-Fi bands in operation by a device may indicate a low or high power mode. Obtaining this information at regular intervals can allow the system and method to determine or estimate how long each device has been operating in each power mode.

The electrical usage of a device may be inferred from its Wi-Fi parameters or signal. For example, a device may be able to operate on different Wi-Fi bands (e.g., a dual-band device operating at 2.4 GHz and 5 GHZ). For dual-band devices, it is determined that only 2.4 GHz is being used then it may be inferred that the device is operating a lower power mode. Furthermore, the specific Wi-Fi protocol may be used to infer a power mode and so electricity usage.

In any case, at step 130 the data representing electricity usage is maintained and stored for each local network. The format and content of the stored data can take different forms. However, the electricity usage of all devices in the local network (or at least a subset of all devices) is stored at a location external to the local network or networks. Therefore, the electricity usage of different devices are maintained and centrally aggregated for further processing. This further processing may include comparison ranking, or otherwise interpreted both between devices in the same local network and across different local networks. The data may be provided to other entities from this central data store. Furthermore, the data may be manually presented to a user of each local network or to different entities, provided sufficient permissions have been provided. The data sets may be described as an energy fingerprint of the local network or property served by the local network (e.g., a home or office). Other device data may be included in the data set (e.g., identifiers, device type, location data, etc.).

At step 140, one or more actions may be taken based on the consolidated data set. For example, the device or devices with the highest electricity usage (or those reaching a threshold) may be identified. Actions may be taken on this subset (or single) device. For example, the user of a particular local network may be prompted or reminded to take an action, such as to turn off the device. The action may be automated. For example, the device may be switched off or placed into a lower power mode of operation (e.g., a standby mode). Such commands may be transmitted over Wi-Fi or another communication protocol. The method 100 may be implemented as part of a computer system 200.

As shown in FIG. 2, the computer system 200 includes a number of components including communication interfaces 220, system circuitry 230, input/output (I/O) circuitry 240, display circuitry and interfaces 250, and a datastore 270. The system circuitry 220 can include one or more processors or CPUs 280 and memory 290. The system circuitry 230 may include any combination of hardware, software, firmware, and/or other circuitry. The system circuitry 230 may be implemented, with one or more systems on a chip (SoC), application specific integrated circuits (ASIC), microprocessors, and/or analog and digital circuits.

The display circuitry may provide one or more graphical user interfaces (GUIs) 260 and the I/O interface circuitry 240 may include touch sensitive or non-touch displays, sound, voice or other recognition inputs, buttons, switches, speakers, sounders, and other user interface elements. The I/O interface circuitry 240 may include microphones, cameras, headset and microphone input/output connectors, Universal Serial Bus (USB) connectors, and SD or other memory card sockets. The I/O interface circuitry 240 may further include data media interfaces (e.g., a CD-ROM or DVD drive) and other bus and display interfaces.

The memory 290 may include volatile (RAM) or non-volatile memory (e.g., ROM or Flash memory). The memory may store the operating system 292 of the computer system 200, applications or software 294, dynamic data 296, and/or static data 298. The datastore or data source 270 may include one or more databases 272, 274 and/or a file store or file system, for example.

Figure 3:
FIG. 3 shows an example data model format used in the method of FIG. 1.

FIG. 3 shows an example data format for an application programming interface (API) return following an API call. The API may be part of a network as a platform (NaaP)

service, for example. The API provides the consolidated dataset of electricity usage for the local network.

The system and method augments device data models to provide energy parameters, enabling communication using different protocols including a new NaaP API. Such an API may become part of a standard (e.g., a CAMARA standard API). The energy fingerprint or an energy digital shadow of a property served by the local network may be stored in a physical or virtual storage location (e.g., cloud storage). The API may be exposed to third parties (e.g., suitably anonymised, unless the user or customer provides consent to data sharing). In an example implementation, energy companies may obtain services from broadband or internet service providers implementing the system and method to generate data so that the energy companies can segment their customer base into more granular segments or personas. That may enable them to share "cost per device per day" information and/or offer more customised tariffs, based on energy requirements of devices in each property. These data may be obtained from the data store using a suitable interface or controller.

The API may be included in standard services or added to TeleManagement Forum (TM Forum) open APIs. This can be used in exposing life cycle management of network services for both design time declaration and run-time execution. Quotes, orders, and diagnostics capability can be exposed to users. Product catalog services can be exposed internally and externally. Customer data can be exposed internally.

In the example format of FIG. 3, N represents the number of devices or connected devices. The next part of the data format describes a data model type (e.g., a data model reference) and the number of parameters forming the data model. The final section of the data format shown in FIG. 3 is the payload or parameter values for each device in the local network. Therefore, the combination of the number of connected devices, data model type reference (e.g., Matter standard reference) and/or number of parameters in the data model enables the API response to be processed correctly, with the number of following parameters used as the payload of the response to an API call (request).

A timestamp may be included to indicate the date and/or time when the energy measurement or measurements were made. This time information may also be recorded within the data store. For example, the measurements may be made either in response to the API request or at an earlier time. There may be scheduled (e.g., daily) measurements and the API call retrieves these from a database, for example.

A geo-location tag may also be included, which could for example enable an energy utility customer of the API to correlate energy consumption with local weather and temperature conditions. Certain data, such as geo-location information, may be excluded from the returned data if the user has not provided permission to share such information. Again, such permissions data may be recorded in the data store.

Figures 4, 5:
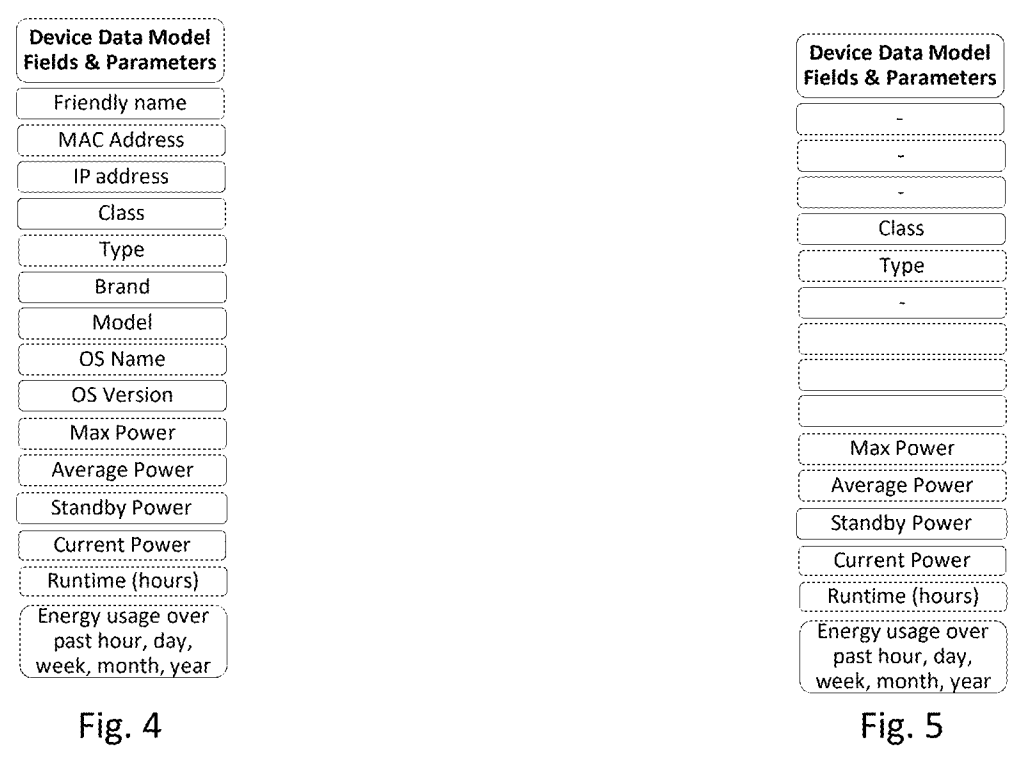

FIGS. 4 and 5 show example data models depending on whether a customer has opted in to enable full data sharing (e.g., including identifying and geo-location information). The exact parameters to be included or permissible in an opt-out scenario will depend on local privacy or data law regulations.

FIG. 4 shows an example opt-in data model. The data included in this model augments device fingerprinting parameters with additional device energy use parameters. Preferably, the data model can be aligned or be compatible with a standardised data model, for example from Matter, broadband forum, (BBF), etc. Customer reference or identifiers may be included the API call. Any additional geo-location information can also be specific in this scenario. These permissions may be gathered from user applications or website account settings, for example.

FIG. 5 shows an example opt-out data model. In this case, some specific device fingerprinting parameters are omitted. The example data model only includes basic device type and energy use parameters. Any customer home reference in the API can be random or otherwise anonymised. Any additional geo-location information may be made less precise or vague (e.g., only contain county or region). A NaaP Network Exposure Layer (NEL) may process the gathered device data so that the northbound data model used to communicate the home's device energy information via the NaaP API can align with the customer's opt-in opt-out preferences.

Figure 6:
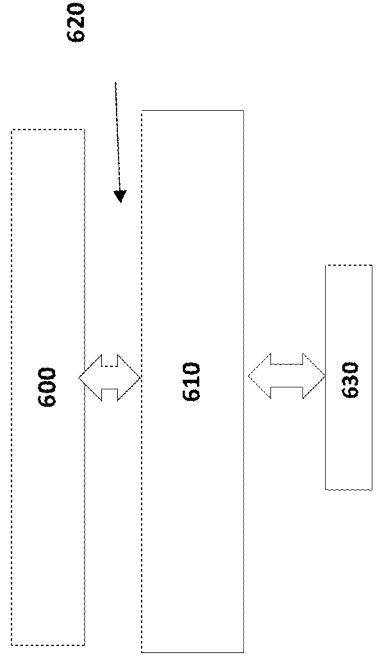
FIG. 6 shows a schematic diagram illustrating how a third-party application provider makes an API call request and receives a response as part of and example implementation of the method of FIG. 1.

FIG. 6 shows a schematic diagram illustrating how a third-party application provider 600 makes the API call or request and receives a response (e.g., from a network component of an internet service provider (ISP). This may be achieved using a network platform abstraction 610. A published API 620 facilitates the request and response in the form of API calls. The network platform abstraction 610 obtains data from a cloud storage or other storage location 630. The API may be provided by the network as a platform (NaaP) system, for example. This system and method allow third parties, such as energy providers to more easily and efficiently obtain device energy information from each property. The approach may be independent of the home device management protocol and Message Transfer Protocol (e.g., TR-069 CWMP, TR-369 USP, SNMP, etc.). In a network management approach, granularity (number of energy consumption data points used to construct the data model) can be evolved over time by the network operator independent of the API. Therefore, NaaP APIs can abstract the detail and complexity away from the API customer (e.g., energy utility or application developer).

Figure 7:
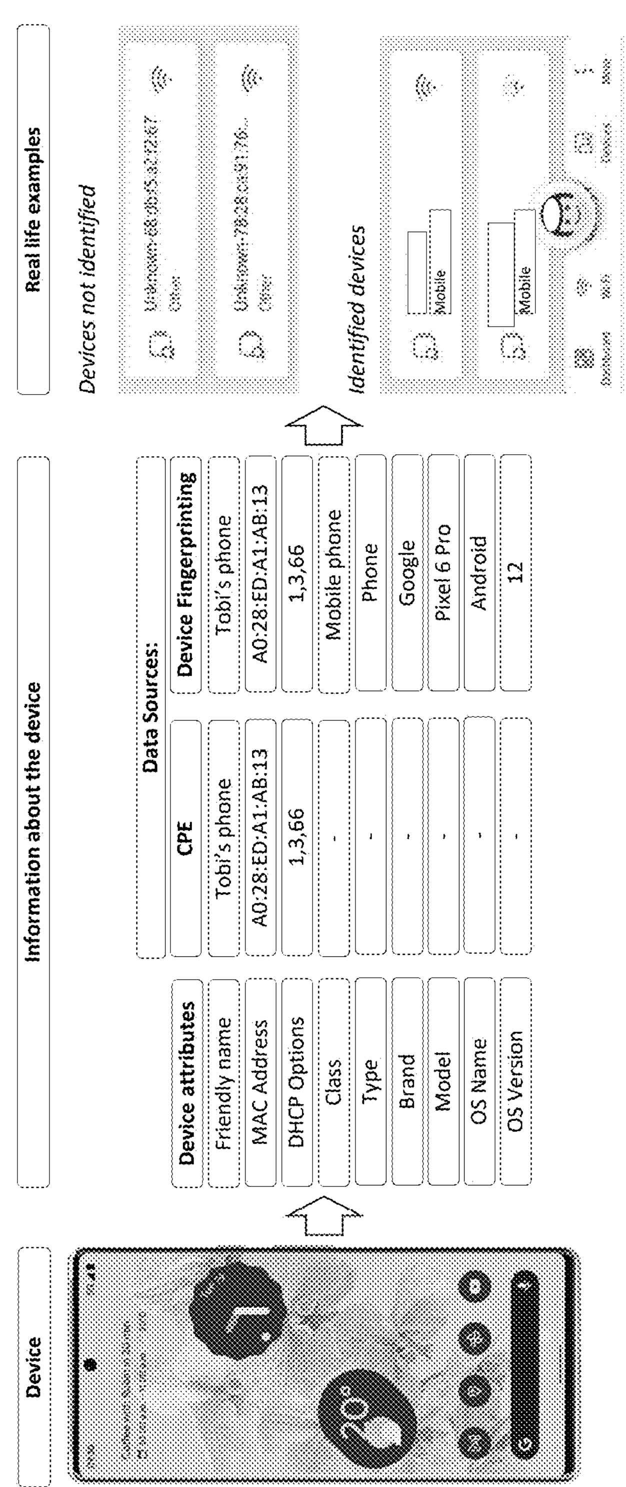
FIG. 7 illustrates schematically device fingerprinting in which data is obtained and inferred about devices in the local network.

FIG. 7 illustrates schematically the concept of device fingerprinting. In this example, the device is a smart phone but can be any device, especially those with a mains electricity source. The customer premises equipment (CPE) such as a broadband router or gateway can directly receive some data from the connected device. However, certain further data can be inferred, as indicated by the data set "Device Fingerprinting". Device fingerprinting is an example technology that enriches device information based on device database intelligence. This can be obtained using AI or other techniques. The present system and method expand this concept to include electricity and energy fingerprinting with additional device information being provided by the device itself and/or by looking up stored energy information from external data sources (or a combination of both). FIG. 8 shows screenshots of a mobile device application that provides device fingerprinting information. Screen 1 shows the identification of devices on the local network and screen 2 shows more details about an individual device.

FIG. 9 shows a schematic diagram of alternative data models for storing the device energy information. Arrows 900 indicate manual data flows and arrows 910 indicate automatic data flow. FIG. 9A shows a data model in which manual data flows are used to capture information from the physical devices 920 and store them in a digital or virtual environment 930. FIG. 9B illustrates schematically, automated data flows from the physical devices 920 to the virtual environment 930 (i.e., using the methods described above) but with manual updates or configuration changes made from the virtual environment 930 back to the physical devices 920. This can be defined as a digital shadow data model. FIG. 9C shows data flowing automatically in both directions. This can be defined as a digital twin data model. Therefore, automated actions can be taken and implemented in the real world as device energy information is received and changes.

Figure 10:
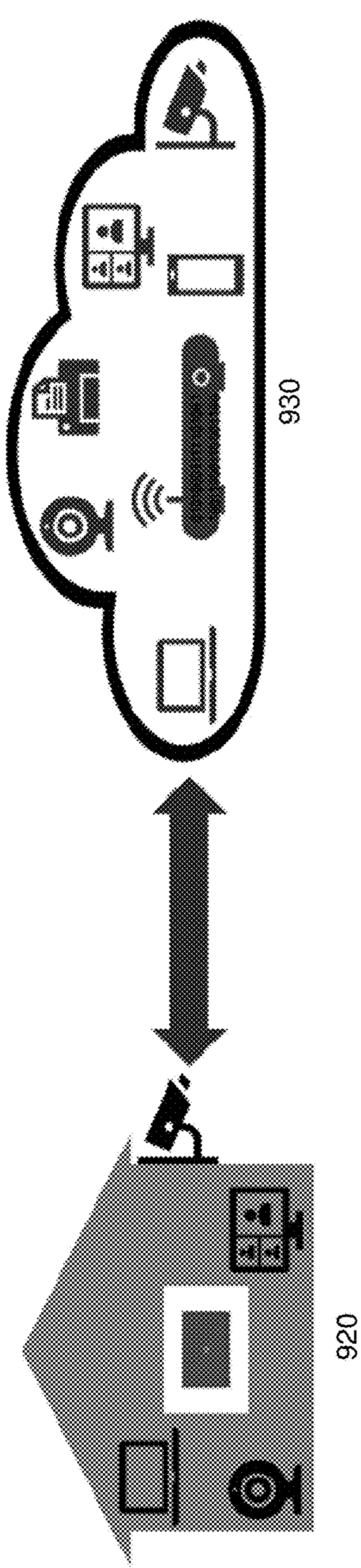
FIG. 10 shows schematically the updating of data between devices in the local network and virtual representations of those data.

FIG. 10 shows schematically and in more detail the data flowing between the real-world devices and the virtual environment. As described previously, device fingerprinting creates an energy fingerprint of devices within the local network. In this example, the simple data model has been expanded from device identification to include its energy consumption characteristics obtained using the described methods. For example, in a first option, each device type can be identified (e.g., manufacturer, device type, model, etc.). A look-up table may be used to provide the maximum and typical power consumption in different modes of operation (e.g., active and standby modes) for each device. In an alternative implementation, each (or any) device can measure its device energy consumption and provide this information through the local network to a virtual server or external entity, e.g., in a cloud storage (like a virtual meter). Information from each device may be acquired over a local wireless network such as Wi-Fi, Z-wave, Zigbee, Matter, etc. preferably in a predetermined format with agreed parameters in using a data model with telemetry options. The BBF TR-181 data model includes some options for this. This may be a standardised data model so that different device suppliers can align and integrate more effectively.

In an example implementation using a digital shadow data model, once the energy fingerprint of a local network (e.g., home or office) is captured (measured or identified and then modelled), the information can be used to construct a dashboard. The dashboard may show the home or business owner (or any other user) what devices are active and the times of this activity. This dashboard may also illustrate and present those devices that consume the most energy. This can enable opportunities or recommendations to the user suggesting which devices could be switched off overnight or at other times to reduce energy costs. Such a dashboard may be provided to external entities for individual or groups of local network based on the data in the external data store and accessed using the API functionality, or otherwise.

In a further example implementation, a closed loop energy saving or management system may be used. This can go beyond a dashboard scenario with recommendations to the user or customer being replaced or supplemented to take automatic actions, such as switching off certain devices or putting them into a sleep mode automatically based on the information received from the local network. Such decisions may be threshold-based or machine learning (ML) or AI could characterise a customer's home, learn what devices are used and when, which devices consume the most energy, and propose or implement an optimal approach to energy reduction without impacting the customers' (domestic or commercial) normal activities and associated device usage routines. Therefore, this enhanced approach adds power management commands to device data models. This functionality can be implemented from within each local network or by an external controller monitoring and managing a plurality of local networks based on data synchronised with the data store in real time or at regular intervals. There may be a plurality of external controllers carrying out the same or different activity steps. The controllers may be located at the external data store or be distributed at different locations.

Further energy saving features may extend beyond turning devices on or off, or putting them into sleep mode. Other device operating parameters may be adjusted to optimise power usage. For example, Wi-Fi RF capacity can be managed more effectively. Wi-Fi RF capacity may be right-sized in the home or network environment based on demand. Wi-Fi 7 allows three Wi-Fi bands (2.4, 5, and 6 GHZ) to be used in aggregate. This pool of Wi-Fi capacity offers a capacity of >30 Gbps. However, such a large or maximum Wi-Fi capacity may not be required at all times. For example, during the night only basic telemetry security cameras together with occasional software updates may be required in the local network. ML may be used to understand the daily diurnal and weekly Wi-Fi usage in the home and calculate what Wi-Fi capacity and/or coverage is needed to deliver unfettered operation. For example, the system and method may monitor Wi-Fi usage, volumes, traffic, and numbers of actively connected devices. When Wi-Fi demand is measured as low or below certain predetermined thresholds, it is possible to turn off one or two of the three Wi-Fi bands. This further reduces power as the transceiver no longer needs to flood the home or office environment with RF that is not required at that instance (saving around 3-4 W per band). Such an action may be performed manually or automatically based on the stored data for a particular local network (e.g., using the ability to expose the aggregated measurement data of the NaaP API). This functionality may be based on a digital twin or digital shadow (in a cloud storage) of each local network.

Furthermore, wake on LAN may be used with internet of things (IoT) and other low-powered or low complexity devices and not just be limited to PCs, laptops and tablets computers. User services platform (USP) control may be extended to smart plugs and power strips.

FIG. 11 shows an example screen shot of a display of a consolidated data set of electricity usage for the plurality of devices operating within the local network. In this example, different colours or shading may be used to indicate the relative consumption of electricity for each device relative to each other or an average. This may be based on the average usage for that device type or for all devices in the local network.

Figure 12:
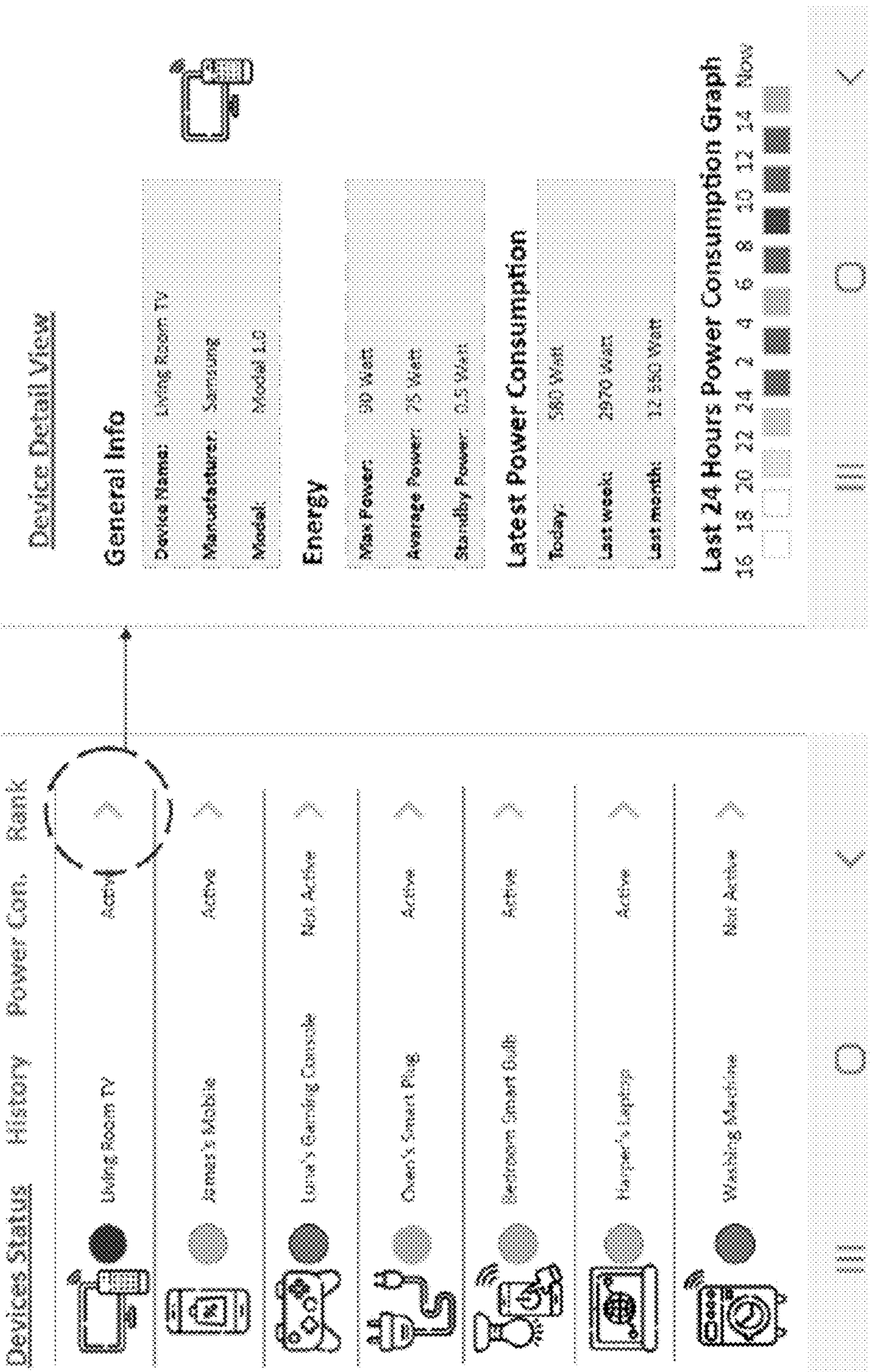
FIG. 12 shows further screens shots of the mobile application used to display information obtained using the method of FIG. 1.

FIG. 12 shows a further example screen shot of a display of a consolidated data set of electricity usage for the plurality of devices operating within the local network. This figure illustrates how a first screen can show an overview of a plurality (or all) devices in the local network and a second screen can display more detailed energy usage information for a single device as well as usage graphs over time (e.g., 24 hours). The consolidated data set does not need to be displayed but can be otherwise stored and processed.

Figure 14:
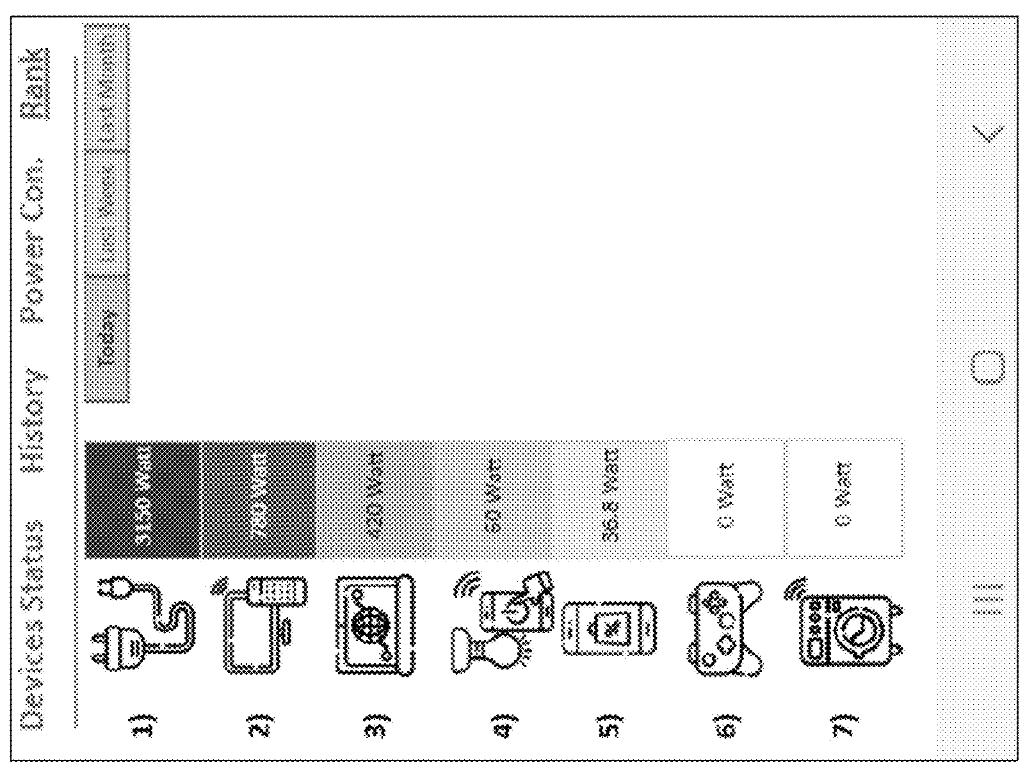
FIG. 14 shows further screens shots of the mobile application used to display information obtained using the method of FIG. 1.
Figure 15:
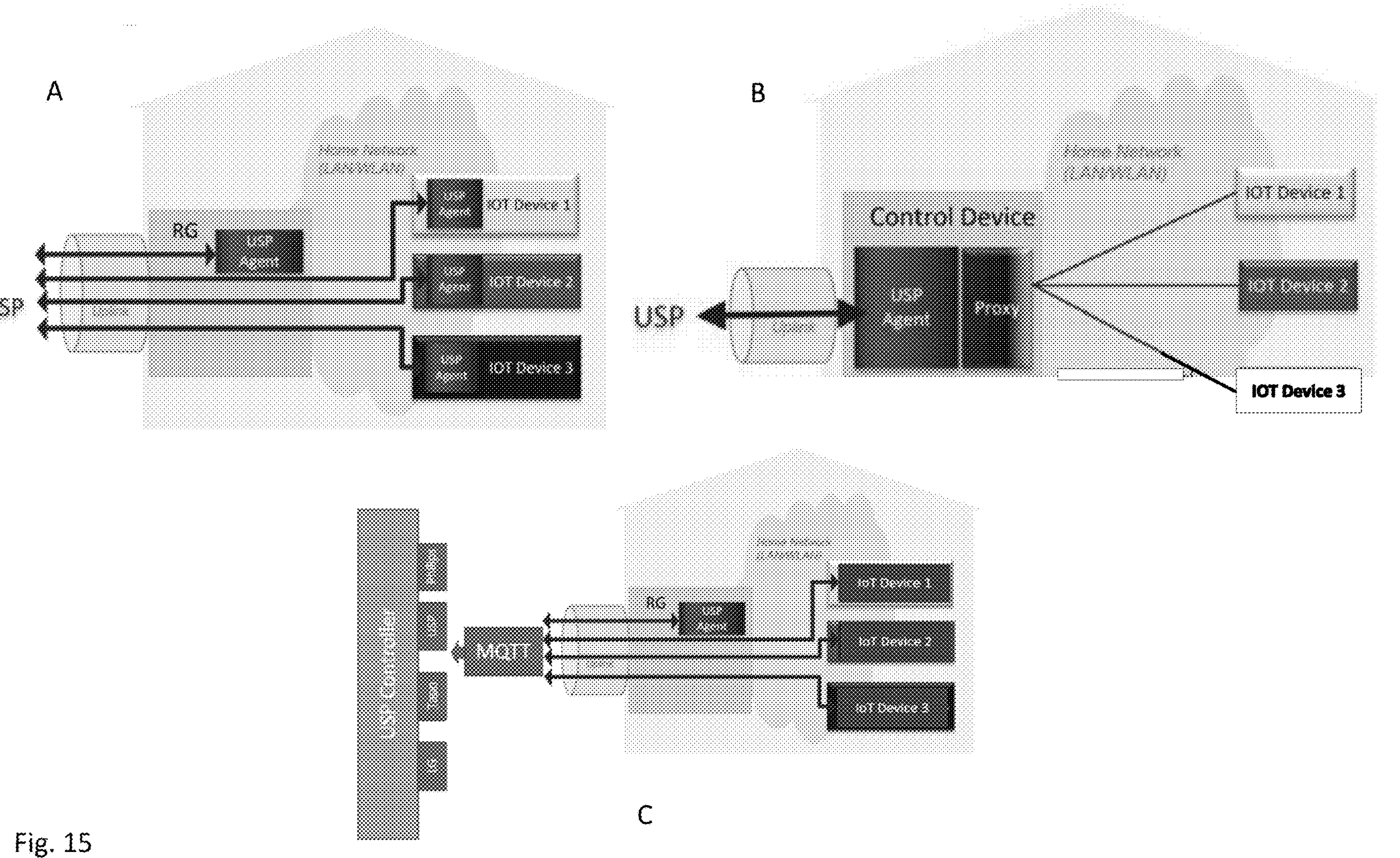
FIG. 15 shows schematic diagrams of different example communication architectures (A, B, and C) used with the method of FIG. 1.

FIGS. 13 and 14 shows further example screen shots (e.g., from a mobile application) illustrating different ways of indicating relative electricity consumption and history. Therefore, the electricity consumption of each device can be monitored over time more effectively. FIG. 15 shows two alternative communication architectures (A, and B) for implementing the method 100. Each communication architecture is based around the User Services Platform (USP), which is a standardised protocol of BBF. Each architecture can implement a different data model. A USP agent is used to manage, monitor, update, and control devices within each local network.

FIGS. 15A-C illustrate different design or architecture options for remote device management when using the BBF's USP protocol to manage IoT devices (e.g., within a home or office environment). In the architecture shown in FIG. 15A, a USP agent is implemented within each device (IoT devices 1 to 3 in this figure). Therefore, each device must support the USP protocol and represents and fully standardised environment. A USP agent may also be installed within the router/gateway (RG) serving the local network (Home Network in this figure). In this example implementation, each device may have its own data model with independently maintained external data.

In the architecture shown in FIG. 15B, a USP agent is implemented within a control device within the local network. A proxy receives and consolidates data from each device and passes this to the USP agent. The control device may be a router/gateway servicing the local network or a separate component. Therefore, each device does not need to support the USP protocol (or another alternative protocol). Each device may have its own protocol which is translated by the proxy. In this example implementation, there may be a combined data model with the data for each local network transmitted and stored together within the same data model. This approach provides greater flexibility and allows the inclusion of different and legacy devices but may require more integration effort.

FIG. 15C illustrates schematically how either architecture (15A or 15B) may be integrated beyond the local networks. MQTT or another telemetry transport protocol provides asynchronous communications with an external USP controller. The USP controller can manage a plurality of local networks and can provide data to external entities or subscribers, such as energy suppliers. The USP controller acts as a data aggregator and central data store. The USP controller may store data in a local database or use virtual data stores. The data may be provided to external entities using the NaaP and API functionality described above. Other protocols may be used to replace USP.

The method and system may be implemented in hardware, software, or a combination of hardware and software. The method and system may be implemented either as a server comprising a single computer system or as a distributed network of servers connected across a network. Any kind of computer system or other electronic apparatus may be adapted to carry out the described methods.

As used throughout, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion multipole device) means "one or more" (for instance, one or more ion multipole device). Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the disclosure. That is, an element termed a "first" element may instead be termed a "second" element and an element termed a "second" element may instead be considered a "first" element.

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described throughout, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

Unless otherwise described, all technical and scientific terms used throughout have a meaning as is commonly understood by one of ordinary skill in the art to which the various embodiments described herein belongs.

As will be appreciated by the skilled person, details of the above embodiment may be varied without departing from the scope of the present invention, as defined by the appended claims.

For example, different wireless protocols may be used to obtain device information or different protocols may be used for different devices in the same local network. The data may be stored in different types of data stores and not just virtual databases. Additional security architecture and encryption may be used to protect the data store and data communications to and from the data store and local networks. Multiple data stores may be used for load balancing and other purposes.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The following numbered clauses provide further example implementations:

1. A method managing and/or monitoring electricity usage of one or more local networks, the method comprising the steps of:
   - determining electricity usage of a plurality of devices operating within one or more local networks; and
   - maintaining in a data store external to each local network, data representing the determined electricity usage for each device of the plurality of devices and data identifying the device local network of the device.
2. The method of clause 1 further comprising the step of: executing one or more actions based on the data representing the determined electricity usage.
3. The method of clause 2, wherein the one or more actions comprises changing a mode of operation of at least one of the plurality of devices.
4. The method of clause 3, wherein changing the mode of operation is to switch off one or more Wi-Fi bands of the at least one of the plurality of devices.
5. The method according to any of clauses 2 to 4 further comprising the step of switching one or more of the devices of the plurality of devices from a high power mode to a low power mode or switching off one or more of the devices.
6. The method according to any of clauses 2 to 5, wherein the one or more actions are implemented as power management commands stored within the data store and transmitted to one or more devices of the plurality of devices.

7. The method according to any previous clause, wherein the data representing the determined electricity usage is updated and stored or synchronised continuously.

8. The method according to any previous clause, wherein the step of determining electricity usage of the plurality of devices operating within the one or more local networks further comprises the step of receiving from each device data providing the electricity usage.

9. The method of claim 8, wherein the data received from each device is a standardised format and includes an identifier of the device.

10. The method of claim 9, wherein the standardised format is any one of:
Matter; broadband forum, BBF; and comma separated variable, CSV.

11. The method according to any previous clause, wherein the step of determining electricity usage of a plurality of devices operating within one or more local networks further comprises the steps of:
determining a device type for each device operating within the one or more local networks; and
retrieving from a data storage, data indicating electricity usage for the device type of each device.

12. The method according to any previous clause further comprising the step of determining a power mode of the plurality of devices, wherein the data indicating the electricity usage includes electricity usage during a low power mode and a high power mode of at least one device type.

13. The method of claim 12, wherein the step of determining electricity usage of the plurality of devices operating within the one or more local networks further comprises determining an amount of time of the at least one device spent in the low power mode and an amount of time spent in the high power mode.

14. The method according to any previous clause, wherein the step of determining electricity usage of the plurality of devices operating within the one or more local networks further comprises:
determining a Wi-Fi signal strength of at least one of the plurality of devices operating within the local network.

15. The method according to any previous clause further comprising the steps of: retrieving from the data store data representing the determined electricity usage for each device in at least one of the plurality of local networks; and providing the retrieved data to a server external to the local network.

16 The method of claim 15, wherein the step of providing the retrieved data to a server external to the local network further comprises providing a response to an application programming interface, API, request issued by the server external to the local network.

17. The method of claim 15 or clause 16, wherein the provided data includes location data of the at least one local network.

18. The method according to any previous clause, wherein the details of the plurality of devices operating within the local network comprises any one or more of:
device name;
device type;
location;
IP address;
MAC address; and
brand.

19. One or more non-transitory computer-readable media storing instructions that, when executed by a computing device comprising at least one processor and memory, cause the computing device to:
determine electricity usage of a plurality of devices operating within one or more local networks; and
maintain in a data store external to each local network, data representing the determined electricity usage for each device of the plurality of devices and data identifying the device local network of the device.

20. A computer system comprising:
at least one processor;
memory storing instructions that, when executed by the at least one processor, cause the computer system to:
determine electricity usage of a plurality of devices operating within one or more local networks; and
maintain in a data store external to each local network, data representing the determined electricity usage for each device of the plurality of devices and data identifying the device local network of the device.

The invention claimed is:

1. A method comprising the steps of:
determining electricity usage of a plurality of devices operating within one or more local networks, wherein determining electricity usage of a plurality of devices operating within one or more local networks comprises the steps of:
determining a device type for each device operating within the one or more local networks; and
retrieving from a data storage, data indicating electricity usage for the device type of each device;
maintaining in a data store external to each local network, data representing the determined electricity usage for each device of the plurality of devices and data identifying the device local network of the device; and
determining a power mode of the plurality of devices, wherein the data indicating the electricity usage includes electricity usage during a low power mode and a high power mode of at least one device type.

2. The method of claim 1 further comprising the step of:
executing one or more actions based on the data representing the determined electricity usage.

3. The method of claim 2, wherein the one or more actions comprises changing a mode of operation of at least one of the plurality of devices.

4. The method of claim 3, wherein changing the mode of operation is to switch off one or more Wi-Fi bands of the at least one of the plurality of devices.

5. The method of claim 2 further comprising the step of switching one or more of the devices of the plurality of devices from a high power mode to a low power mode or switching off one or more of the devices.

6. The method of claim 2, wherein the one or more actions are implemented as power management commands stored within the data store and transmitted to one or more devices of the plurality of devices.

7. The method of claim 1, wherein the data representing the determined electricity usage is updated and stored or synchronised continuously.

8. The method of claim 1, wherein the step of determining electricity usage of the plurality of devices operating within the one or more local networks further comprises the step of receiving from each device data providing the electricity usage.

9. The method of claim 8, wherein the data received from each device is a standardised format and includes an identifier of the device.

10. The method of claim 9, wherein the standardised format is any one of:

matter; broadband forum, BBF; and comma separated variable, CSV.

11. The method of claim 1, wherein the step of determining electricity usage of the plurality of devices operating within the one or more local networks further comprises determining an amount of time of the at least one device spent in the low power mode and an amount of time spent in the high power mode.

12. The method of claim 1, wherein the step of determining electricity usage of the plurality of devices operating within the one or more local networks further comprises:

determining a Wi-Fi signal strength of at least one of the plurality of devices operating within the local network.

13. The method of claim 1 further comprising the steps of:

retrieving from the data store data representing the determined electricity usage for each device in at least one of the plurality of local networks; and providing the retrieved data to a server external to the local network.

14. The method of claim 13, wherein the step of providing the retrieved data to a server external to the local network further comprises providing a response to an application programming interface, API, request issued by the server external to the local network.

15. The method of claim 13, wherein the provided data includes location data of the at least one local network.

16. The method of claim 1, wherein the details of the plurality of devices operating within the local network comprises any one or more of:

device name;
device type;
location;
IP address;
MAC address; and
brand.

17. The method of claim 1, wherein the plurality of devices includes any one or more of:

a television;
a computer;
a refrigerator;
a freezer;
a smart phone;
a camera;
a washing machine;
a dryer;
a water heater;
a dish washer; and/or
an oven.

18. The method of claim 1, wherein the data indicating the electricity usage includes a stored electricity consumption parameter associated with a low power mode and a stored electricity consumption parameter associated with a high power mode.

19. One or more non-transitory computer-readable media storing instructions that, when executed by a computing device comprising at least one processor and memory, cause the computing device to:

determine electricity usage of a plurality of devices operating within one or more local networks, wherein determining electricity usage of a plurality of devices operating within one or more local networks comprises the steps of:

determining a device type for each device operating within the one or more local networks; and retrieving from a data storage, data indicating electricity usage for the device type of each device;

maintain in a data store external to each local network, data representing the determined electricity usage for each device of the plurality of devices and data identifying the device local network of the device; and determine a power mode of the plurality of devices, wherein the data indicating the electricity usage includes electricity usage during a low power mode and a high power mode of at least one device type.

20. A computer system comprising:

at least one processor;

non-transitory memory storing instructions that, when executed by the at least one processor, cause the computer system to:

determine electricity usage of a plurality of devices operating within one or more local networks, wherein determining electricity usage of a plurality of devices operating within one or more local networks comprises the steps of:

determining a device type for each device operating within the one or more local networks; and retrieving from a data storage, data indicating electricity usage for the device type of each device;

maintain in a data store external to each local network, data representing the determined electricity usage for each device of the plurality of devices and data identifying the device local network of the device; and determine a power mode of the plurality of devices, wherein the data indicating the electricity usage includes electricity usage during a low power mode and a high power mode of at least one device type.

* * * * *